Patented Feb. 4, 1936

2,029,786

UNITED STATES PATENT OFFICE 2,029,786

CATALYST

William Whalley Myddleton, Hanworth, England, assignor to Robinson Bindley Processes Limited, Sutton, England No Drawing. Application July 19, 1933, Serial No. 681,222. In Great Britain July 26, 1932

4 Claims. (Cl. 23—236)

This invention relates to catalysts and has for its object to provide an improved nickel catalyst of powdered or granular form, particularly for use in the hardening of oils.

Nickel in powder form is well known as a catalyst but the smallness of the particles creates difficulties in the subsequent separation of the catalyst from the oil and methods have been sought, hitherto without success, for supporting the nickel powder on other materials with a view to facilitating the removal of catalyst by sedimentation or other means.

According to my invention I combine nickel oxide with a readily hydrolizable silicon ester or esters hereafter referred to as silicon ester and then heat it in an atmosphere of hydrogen when a resulting product consisting of granules of silica and nickel is produced and the effect is that not only does the silica form a support for the nickel but the associated silica and nickel proves more effective as a catalyst.

In carrying the invention into practice the nickel oxide powder, and silicon ester in solution in its commercial form, are mixed into a paste and a small percentage of ammonia added to effect coagulation. The mass is stirred and in the process of stirring is broken up into granules. These granules are then thoroughly dried or allowed to dry and are subjected to heat at a temperature below 500° centigrade in an atmosphere of hydrogen or other reducing gas. A suitable temperature is 480° centigrade but it is possible that temperatures as low as 250° centigrade or 300° centigrade may be found to be effective.

According to one specific example a gallon of the ester solution (ethyl ortho-silicate) is mixed with about ½ lb. of the nickel oxide powder and about ½ ounce of aqueous ammonia. This proportion of ammonia is such as will ensure coagulation which is the purpose for which it is used. The mixture will take the form of a thick pasty mass and will, when stirred, readily break up into particles or granules. After the drying and reducing operations before mentioned have been effected the result will be found to be, with the proportions given, a granular material composed of silica and nickel the percentage of nickel being in the region of 12%; the nickel being supported by the silica and the combined silica and nickel will be found to form a more effective catalyst than nickel alone. Moreover the catalyst thus prepared is readily separated from the oil after hydrogenation, by sedimentation or other means. The rapidity with which sedimentation occurs would make it possible to use the granular catalyst in a continuous hydrogenation of oil flowing through the hydrogenator at a suitable rate. The following is an example of the process as carried out experimentally with complete success.

The catalyst was prepared by stirring 6 ounces nickel oxide, obtained by heating the carbonate, into 1 gallon of a solution of silicon ester in toluene. Half a fluid ounce of strong aqueous ammonium hydroxide solution was added, and in a few minutes the mixture became pasty and soon broke up into granules. The resulting product was air dried for several hours and was finally reduced by heating in a stream of hydrogen at a temperature of 480° centigrade.

The reduced mass was cooled and transferred to a small quantity of the oil to be hydrogenated to protect the catalyst during storage.

A quantity of the suspension of catalyst in oil was added to a bulk of the oil (cotton seed oil in this example) sufficient to form a mixture containing 2½ per cent of the granular catalyst in oil.

Hydrogen was blown into the mixture while such mixture was at atmospheric pressure in such manner as to mix the catalyst with the oil, the oil being heated to a temperature of 180° centigrade.

The oil was rapidly hydrogenated under these conditions and immediately after cooling to 120° centigrade and then cutting off the flow of hydrogen the oil was poured off in a clear condition and was found to contain mere traces of catalyst.

Fresh batches of oil were hydrogenated by adding to the catalyst left after pouring off the previous batch.

Thus I have by my invention not only produced an improved catalyst but have overcome the difficulty hitherto experienced of finding a means for supporting a nickel catalyst.

It will be apparent from the foregoing that the improved catalyst may be used in granular form, in such a manner that the usual "batch" processes can be made to operate continuously but, of course, it will be understood that the granules may be attached to a gauze of suitable mesh or other support, silicon ester itself effecting the necessary adhesion.

What I claim and desire to secure by Letters Patent is:—

1. The process of preparing a nickel catalyst consisting in mixing nickel oxide with silicon ester, effecting coagulation by the addition of ammonia, breaking into granules and drying and subjecting the granules to the action of heat in an atmosphere of hydrogen or other reducing gas.

2. An improved catalyst consisting of nickel adhesively attached to granules of silica, obtained by mixing nickel oxide with hydrolizable silicon ester, effecting coagulation, breaking into granules and drying, and without preliminary combustion subjecting the dried granules to the action of heat in an atmosphere of reducing gas.

3. Process of preparing a nickel catalyst which comprises mixing a reducible nickel compound with a solution of a readily hydrolizable silicon ester to the production of a pasty mass, coagulating the mass by the addition of a coagulating agent, granulating the mass, drying the granules and reducing the nickel compound without preliminary combustion.

4. Process of preparing a nickel catalyst which comprises mixing a reducible nickel compound, a solution of a silicon ester and a coagulating agent to the production of a pasty mass, stirring the mass to break it into granules, drying the granules, and without preliminary combustion reducing with hydrogen at a temperature of at least 250° C.

WILLIAM WHALLEY MYDDLETON.